United States Patent [19]

Green

[11] 4,245,434

[45] Jan. 20, 1981

[54] METHOD AND APPARATUS FOR IRRIGATING CONTAINER-GROWN PLANTS

[76] Inventor: Evert Green, 14 Kenneth Ave., N. Bellmore, N.Y. 11710

[21] Appl. No.: 49,325

[22] Filed: Jun. 18, 1979

Related U.S. Application Data

[63] Continuation-in-part of Ser. No. 19,563, Mar. 12, 1979.

[51] Int. Cl.³ .............................................. A01G 27/00
[52] U.S. Cl. .......................................... 47/80; 47/81; 47/62
[58] Field of Search ..................................... 47/79–81, 47/62

[56] References Cited

U.S. PATENT DOCUMENTS

| | | | |
|---|---|---|---|
| 2,810,235 | 10/1957 | Magid | 47/81 |
| 3,220,144 | 11/1965 | Green | 47/80 |
| 3,534,498 | 10/1970 | Herrli | 47/81 |
| 3,778,928 | 12/1973 | Green | 47/80 |
| 4,001,968 | 1/1977 | Green | 47/80 |
| 4,117,632 | 10/1978 | Pearce | 47/81 |

*Primary Examiner*—Robert E. Bagwill
*Attorney, Agent, or Firm*—Kenyon & Kenyon

[57] ABSTRACT

The subirrigation of soil in a container for container-grown plants is accomplished upwardly through an opening in the container bottom by placing the container on the upper surface of a capillary sheet in the form of a sheet wettable plastic having a multiplicity of capillary openings therein and by disposing the capillary sheet so that its undersurface directly overlies in unbonded face-to-face contacting relation an essentially continuous and substantially smooth wettable surface presented by a substantially flat member comprised in a support bed for the container as, for example, by a sheet of plastic overlying a substantially rigid member or by a substantially rigid slab comprised in the support bed and feeding an aqueous liquid into the interface between said surfaces as through feeder tubes by gravity or by capillary travel from a reservoir disposed below the interface, whereby the so fed aqueous liquid becomes distributed by capillary action to any portion of the capillary sheet directly underlying a plant container resting thereon and thence upwardly through the openings in the capillary sheet and into the soil in the container. Other features relate to a duplex supporting tray for plant containers to be irrigated that comprises an upper tray on which plants may be irrigated as described above and a lower tray into which liquid may drain from the upper tray and from which, when required, liquid may be drawn upwardly by a capillary wicking action to irrigate soil in containers supported by the upper tray.

7 Claims, 11 Drawing Figures

METHOD AND APPARATUS FOR IRRIGATING CONTAINER-GROWN PLANTS

This is a continuation-in-part of Ser. No. 19,563 filed Mar. 12, 1979.

This invention relates to the irrigation of soil or other growing medium for plants and relates more especially to the irrigation of bodies of soil in conventional plant containers therefor appropriate for plant culture in greenhouse, florist shops, residences, offices and the like.

BACKGROUND OF THE INVENTION

The proper irrigation of soil or other plant growing medium is important in achieving optimal conditions for successful plant culture. In my U.S. Pat. Nos. 3,220,144 and 3,193,970 apparatus is disclosed for providing control and regulation of water appropriate in the case of a single plant. In my U.S. Pat. No. 3,778,928 an irrigation system is disclosed appropriate for controlling irrigation to a plurality of plants in individual containers disposed on a common support such as a bench used in a greenhouse. In my U.S. Pat. No. 4,001,968 I disclose a further improvement in a system for the subirrigation of soil in plant containers characterized by the employment of a capillary sheet having a multiplicity of substantially evenly spaced capillary openings therein overlying a water receptive material which preferably is in the form of the silica sand catalyst sheet that is more particularly described in said U.S. Pat. No. 4,001,968 and that is characterized by a plastic sheet having an adherent continuous coating approximately 1 grain in thickness of silica sand particles essentially in the range from abut 0.002 mm to about 0.25 mm that are interspersed with a network of capillary spaces conductive to lateral spreading of water therealong. Conditions providing excellent results in accomplishing subirrigation are afforded by the method and means disclosed in my U.S. Pat. No. 4,001,968. However, in order to attain the advantage of the silica sand catalyst sheet described in my patent the sheet must be manufactured by the application of the silica sand particles to an adhesive surface presented by a plastic sheet. This requires the use of apparatus appropriate for the purpose and the supply of silica sand particles having the requisite dimensional characteristics. Accordingly, the silica sand catalyst sheet contributes significantly to the overall expense of an installation utilizing and comprising the subirrigation system disclosed in my U.S. Pat. No. 4,001,968.

It is an object of this invention to provide a subirrigation system and method which successfully provides water to soil in plant containers resting on the capillary sheet hereinabove referred to without the employment of the silica sand catalyst sheet for accomplishing capillary travel under the capillary sheet into the area of the capillary sheet in contact with the bottom of a plant container.

It is a further object of this invention to provide a subirrigation system which can be successfully employed and which may be afforded without the expense incident to the preliminary formation of the silica sand catalyst sheet.

Further objects of this invention relate to the provision of an improved tray for supporting plant containers for accomplishing subirrigation which utilizes the improvement of this invention and also is of improved dual bottom construction.

GENERAL STATEMENT OF THE INVENTION

As a result of my continuing research activities I have found that the aforesaid objectives of this invention may be realized in a surprising manner merely by introducing an aqueous liquid into the interface between the undersurface of a capillary sheet of the character aforesaid that presents a wetable undersurface and an essentially continuous and a substantially smooth wetable surface presented by a support bed for supporting plant containers to be irrigated such as the surface presented by a conventional sheet of plastic or by the surface of a rigid supporting bed. In the latter case all that is required is to spread the capillary sheet directly over the smooth surface of the underlying rigid bed. The water may be water as conventionally available or may contain a suitable amount of plant nutrient. Hereinafter and in the claims the aqueous liquid is referred to as water with the understanding that the water may contain plant nutrients. When the undersurface of the capillary sheet and the surface presented by the support bed are in face-to-face unbonded contacting relation and are wetable with the water I have found that the water becomes laterally distributed about the interface between them by capillary action in an amount that is amply sufficient to provide the necessary moisture for soil contained in a plant container which rests on the capillary sheet. Of course, the plant container should have at least one opening in the bottom thereof such as the usual drain opening that is conventionally employed in containers for soil in which plants may be grown. Water may be fed into the interface from a reservoir which is at a level above the level of the support bed. Moreover, if the aforesaid interface is in communication with a wick extending down into an underlying water reservoir water becomes carried upwardly into and throughout said interface and then travels through the capillary openings underlying the bottom of a plant container resting on the capillary sheet followed by continued upward travel into the soil. In order to provide communication between the upper surface of the capillary sheet and soil in the container that rests on the capillary sheet, one can employ a length of wick material which passes through an opening in the bottom of the container so as to make contact with the upper surface of the capillary sheet and extends a substantial distance up into the soil in the container. Preferably this wick is made of the above-mentioned silica sand catalyst sheet which is fashioned so that the silica sand catalyst sheet will be in direct contact with the upper surface of the capillary sheet and extend therefrom up into the soil in the plant container since the silica sand catalyst sheet exercises a very desirable and effective wicking action. While a wick may be employed I have also found that if the bottom of the container is flat so that substantially the entire area of the bottom of the container is in direct contact with the capillary sheet moisture will effectively migrate from the capillary sheet up into soil in the container even though no wick is employed.

This invention is excellently adapted for use by professional growers in greenhouses where the benches for growing potted plants are of substantial size. Since the plant supporting bed comprised in a greenhouse bench usually is somewhat even the smooth upper surface presented by the support bed is provided by a sheet of wetable plastic that is spread over the support bed of the greenhouse bench. The plastic capillary sheet is then spread over the top of the continuous sheet of plastic and suitable means is provided for gradually feeding water into the interface between the two sheets.

It is an additional feature of this invention that when a subirrigation system is afforded in the manner described any excess water may be taken off through a drain line and recirculated to a sump from which it may be pumped back into a reservoir for supplying water into the region of the interface between the two sheets. By this measure the amount of water is very substantially reduced since the amount of makeup water that is required from an outside source is relatively small. The simplicity of the construction is such that the support bed used for supporting the potted plants in greenhouses may be of any convenient size. Thus while the support bed may be only 3 or 4 feet wide and 6 feet long it also is possible to provide a support bed of substantially greater extent such as several hundred feet from end-to-end and about 6 feet or more wide. In such case a plurality of feed lines may be provided for feeding liquid at appropriate intervals into the interface underlying the capillary sheet.

Installations embodying the present invention that have been used in major experimental installations have been found to be extremely successful in the growing of a number of different plants including not only flowering plants such as poinsettias, roses and the like, but also garden plants such as tomato plants. Considerable difficulty has been experienced in the past in producing greenhouse grown tomatoes which have the desirable characteristics of outdoor grown tomatoes. By use of the subirrigation system of this invention tomato plants have been grown that have produced an abundance of tomatoes which are comparable to those produced by outdoor grown plants.

While this invention is highly desirable for use in greenhouses, it also lends itself to the provision of smaller trays used for supporting potted plants that may be used in residences and in small conservatories such as those used for growing plants as a hobby. Certain features of this invention relate to the construction of such trays. In the case of a relatively small size tray the interface into which the water is supplied may be provided between the undersurface of the capillary sheet and a smooth wetable surface presented by the rigid substantially flat tray bottom. A relatively small tray appropriate for growing potted plants, unlke a greenhouse bench, may be produced with a substantially continuous and smooth upper surface which is wetable and which may directly underlie the capillary sheet. In such case water fed into the interface between the capillary sheet and the upper surface of the rigid tray bottom will become distributed laterally as hereinabove described for accomplishing irrigation of the potted plants by travel through the capillary openings and thence into the soil in the plant container.

It is a further feature of this invention that a tray essentially as herein described may be used in combination with an underlying tray which supports the upper tray with its undersurface in adjacent spaced relation to the upper surface of the lower tray so as to provide a duplex tray. When this combination is employed water may be introduced into the interface between the undersurface of the capillary sheet and the supporting surface comprised in the upper tray which supporting surface may be presented either by a sheet of substantially smooth wetable plastic or, preferably, the upper wetable surface of the rigid slab comprised in the tray bottom from a reservoir from which water may be gradually fed so to flow into the interface for lateral distribution with drainage of any excess water into the underlying tray which serves as a second reservoir. When the water in the first reservoir is exhausted water from the second reservoir provided by the underlying tray is fed back up into the interface by the use of a wicking means which is preferably is in the form of a piece of the silica sand catalyst sheet, e.g., in the form of a tube which extends from the aforesaid interface to the bottom of the underlying tray. However, any other conventional wicking materials such that commonly are sold with pot and saucer combinations for house plants may be employed. When this construction is employed, it is possible to introduce water initially into the underlying tray. However, it is preferable that the water be initially supplied from a reservoir so that it will feed by gravity into the interface with an excess draining into the lower tray as hereinabove described.

As described in my U.S. Pat. No. 4,001,968, the capillary sheet that is used is one that is impervious to moisture and that preferably is opaque and comprises a multiplicity of openings for capillary flow therethrough as described more fully in said patent. The material out of which the capillary sheet may be made is also fully described in my U.S. Pat. No. 4,001,968 and as described in said patent ordinarily is in the form of polyethylene sheet material such as that which is conventionally available in the form of a continuous sheet. The thickness of the sheet material is not critical. Thus good results are obtained from the use of individual sheets the thickness of which is of the order of $1\frac{1}{2}$ mils, or 2 mils. Undesirable growth of algae is minimized by using a capillary sheet that is opaque. In the usual case it is black. The capillary openings may be produced by passing the plastic sheet from an unwind roll to a wind-up roll between which there is a pair of rolls that the sheet passes between, one of the rolls presenting a multiplicity of projecting prongs and the other roll presenting a yieldable surface such that the prongs may pass through the sheet material and may be withdrawn again during travel of the sheet through the nip between the rolls. Capillary openings having desirable functional utility for capillary flow may be produced by using prongs the diameters of which are about 0.045 inch. The spacings between openings in the capillary sheet for all practical purposes are regularly or evenly spaced approximately $\frac{1}{2}$ inch apart. During the process of making the capillary holes the prongs will rip holes larger than 0.045 inch but resealing under use will reduce their size to approximately 0.045 inch. The spacing of about $\frac{1}{2}$ inch is ordinarily employed and the plastic sheet is about 1.5 mils in thickness. In the case of sheets of greater thickness the holes may be more closely spaced so as to run about $\frac{1}{4}$ to $\frac{3}{8}$ inch from each other on the average or somewhat greater than $\frac{1}{2}$ inch for use with large plants. The diameter of the capillary openings in the capillary sheet may vary considerably but essentially should be in the range from about 0.05 to about 0.15 inch.

As described more fully in my U.S. Pat. No. 4,001,968 the silica sand catalyst sheet material when used preferably is made utilizing a vinyl base sheet. By applying a conventional solvent to the surface of the vinyl sheet it can be rendered sufficiently sticky before the solvent evaporates to cause the silica sand to adhere thereto as a thin layer. Alternatively a polyethylene sheet may be used and by applying a conventional water-resistant adhesive that is sticky prior to drying the sand particles can be caused to stick thereto. As aforesaid the silica sand is applied as a thin coating with the sand particles sufficiently closely spaced to provide a network of capillary spaces conducive to lateral spread of water therealong. If the sand layer is substantially thicker than single grain thickness, the sand tends to hold water in a form that may be likened to an absorbant gel which is undesirable as tending to the creation of anaerobic conditions. When the silica sand is essentially of the order of a single grain in thickness the conditions are very favorable to the maintenance of aerobic conditions. Preferably the sand that is employed is one which is somewhat windblown and of the size hereinabove mentioned.

In those modifications of this invention wherein a silica sand catalyst sheet is used, as for example a wick because of its wicking action, this is regarded as desirable inasmuch as the silica sand catalyst is believed to exercise a catalytic effect in stimulating plant growth when moisture containing nutrient is exposed thereto in its travel to the roots of a growing plant. It is one of the advantages of this invention that it lends itself very well to the supply of a plant nutrient contained in the water that is used for supplying moisture since the water is taken up from the bottom into the plant container and the plant nutrient therein is efficiently used without risk of washing it out of the container as is the case when the soil in the plant container is watered from the upper surface. This preferable utilization of nutrient also may be realized by the use of wicks made from other materials but for the reasons above-mentioned when a wicking action is utilized it is preferable that the wicking action be accomplished by the use of the silica sand catalyst sheet which can be used double to get good contacts from capillary sheet to soil in container.

Further purposes, features and advantages as well as more detailed descriptions are set forth hereinafter in connection with the accompanying drawings which are intended to be illustrative of the practice of this invention without, however, limiting the scope of this invention, wherein.

Figures 1, 2, 9:
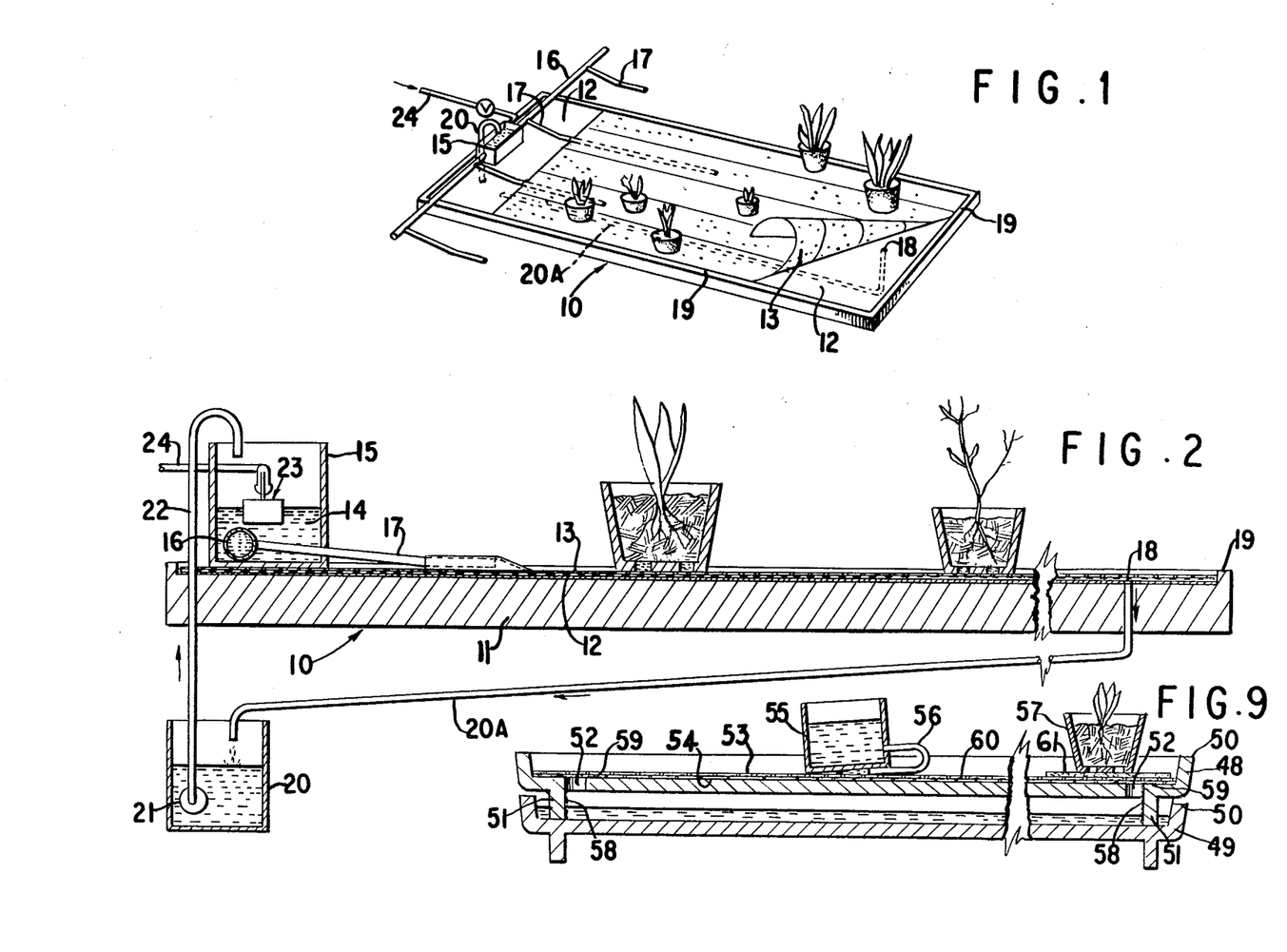
FIG. 1 is a perspective view of an irrigation system embodying this invention wherein the support bed for the plant containers is provided by a greenhouse bench or pallet.
FIG. 2 is a sectional elevation of the system shown in FIG. 1 on an enlarged scale and with an intermediate portion thereof broken away.
FIGS. 9 and 10 are sectional elevations of other embodiments.

With particular reference to FIGS. 1 and 2 a support bed for container-grown plants is shown in the form of a pallet which is indicated generally by the reference character 10. By way of example the pallet may be in the form of a panel of ¾ inch all weather plywood 11 which, if desired, may be provided with stiffening strips underneath (not shown). A sheet of conventional polyethylene plastic 12 is spread over the upper surface of the pallet or panel 10. The polyethylene sheet may be from about 0.004 to about 0.006 mils in thickness and preferably is substantially opaque. Such sheets of polyethylene are commonly manufactured in the form of a continuous roll. The surface of the sheet is substantially smooth and the material is such that the surface is wetable. In other words when moistened with water the water tends to wet the surface as distinguished from being repelled from the surface as would be the case if the surface of the sheet were to be covered with a film of oil. After the sheet of polyethylene plastic has been spread over the surface of the pallet a support bed is thereby provided wherein its upper surface is the smooth wetable surface of the plastic sheet that rests on the underlying substantially rigid slab of plywood or other structural material. This essentially continuous sheet of plastic preferably is opaque.

The capillary sheet 13 is next spread over the surface of the plastic sheet 12 with its undersurface in unbonded direct face-to-face contact with the upper surface of the sheet 12. The surfaces of the capillary sheet also are wetable. Water may be fed into the interface between these two sheets in any desirable way. In the illustrative embodiment shown, a body of water 14 in a reservoir 15 is taken therefrom by a conduit 16 with which leader tubes 17 are connected at appropriate intervals for feeding water gradually into the interface between the two sheets. While in FIGS. 1 and 2 a pallet is shown which may be of the order of 3 or 4 feet ×8 feet, it is to be understood that there may be a succession of contacting support pallets or, alternatively, there may be one continuous bench which may be of extensive extent and which at appropriate intervals can be fed with water from extensions of the conduit 16 having leader tubes 17 communicating therewith.

While the irrigation system may be employed merely by introduction of water into the interface between the continuous plastic sheet and the overlying capillary sheet under conditions such that any water is merely drained onto the ground, it is a further feature of this invention that the supply of water may be conserved by providing drain means as shown by the drain line 18. While only one drain line is shown in the drawing, it is to be understood that depending on the extent of the support bed additional drain lines may be provided at appropriate intervals. To assist the flow of any excess water into the drain line the margin of the support bed preferably is provided with a border strip 19 which, for example, may be about ¼ inch in thickness and about 1 inch in width. For the purpose of conserving the supply of water, particularly when it is regarded as advantageous to fortify the water that is used with a small amount of plant nutrient, the drained water may be directed into the sump 20 through the line 20A. The sump is provided with a pump 21 which when necessary becomes effective to pump the water through the return duct 22 for re-introduction into the reservoir 15. Of course, a certain amount of the water is taken up into the plant containers and by evaporation is taken up by plants growing therein with the result that a certain amount of makeup water is supplied to the water in the reservoir 15 as, for example, by the use of a float valve 23 which controls the inflow of fresh water from the supply line 24. It is a standard practice to chemically reconstruct recycling drainage to plants' requirement.

As shown particularly in FIG. 1 and also in FIG. 2, containers in which plants are being grown may be placed in any position on the upper surface of the capillary sheet. It has been found as a result of repeated experimental tests that in such case the water will travel laterally by capillary action between the two sheets to those areas of the capillary sheet which make contact with the bottom of the several plant containers. In those areas the water has been found to travel upwardly through the openings of the capillary sheet and into the soil in the container so as to supply the root system of a plant being grown in the container with an adequate supply of moisture under conditions such that the supply of water is regulated in a controlled manner.

It is apparent from the foregoing that subirrigation plant supports suitable for use in greenhouses can be provided in a very inexpensive manner when employing the improvements of the present invention. All that is required is a substantially flat support bed of one kind or another and the spreading of the continuous plastic sheet so as to underlie the capillary sheet. In order to assure the most effective lateral capillary distribution it is especially important that the underlying continuous plastic sheet presenting the smooth surface be essentially continuous. After the support bed has been provided in the manner described then means, such as that hereinabove described, may be provided to feed water into the interface between the two sheets for supplying moisture to plant containers which are supported by the support bed provided in the manner described.

Figure 3:
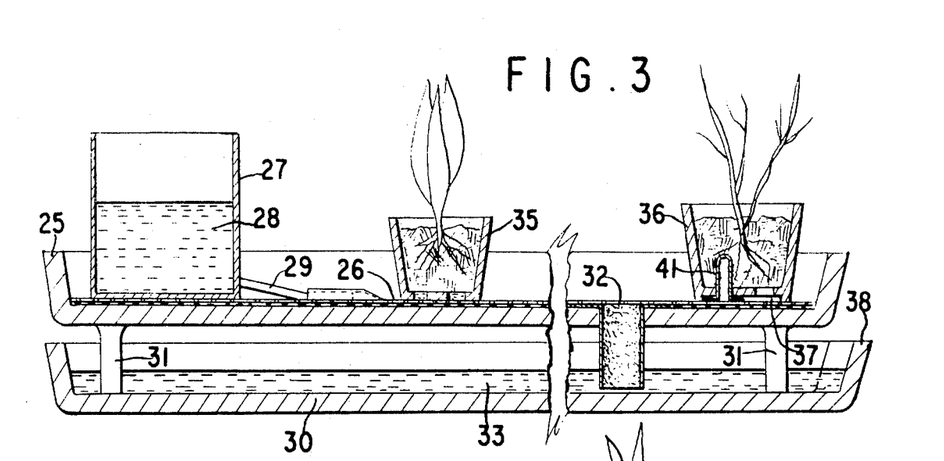
FIG. 3 is a sectional elevation illustrating the employment of this invention as embodied in a duplex tray for use in cultivating container-grown plants, a central portion of the tray being broken away.
Figures 4, 5, 6, 7, 8:
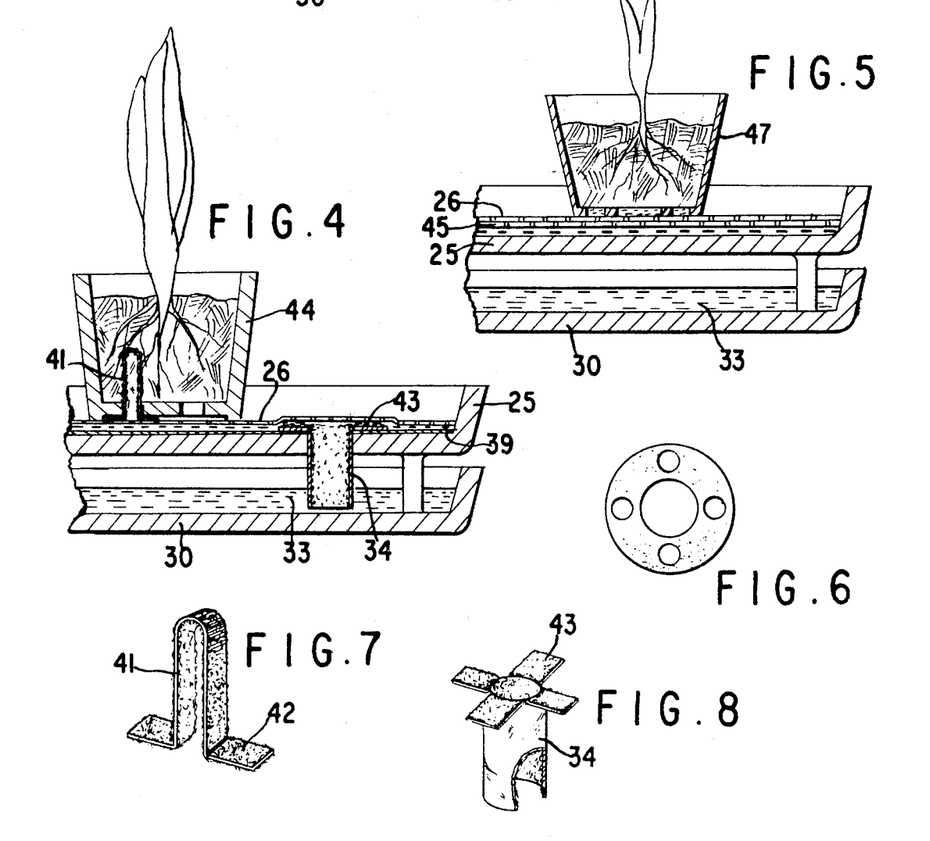
FIG. 4 is a sectional elevation showning an end portion of a duplex tray which is similar to that shown in FIG. 3 but which is illustrative of a different embodiment of the invention.
FIG. 5 is similar to FIG. 4 and illustrates a still further embodiment.
FIG. 6 is a view from below of the bottom of the flat bottom plant container shown in FIG. 5.
FIG. 7 is a perspective view of the silica sand capillary sheet used as a wick in one type of plant container, the capillary sheet is either doubled or sanded on both sides to provide contact.
FIG. 8 is a perspective view of the silica sand catalyst wick used in the duplex trays of FIGS. 3, 4 and 5.

In order to provide effective transmission of water from the upper surface of the capillary sheet through an opening in the bottom of a plant container the bottom of the plant container may be made in either of two ways as is illustrated more particularly in connection with FIGS. 3, 4 and 5 which are to be described. If the plant container is one which has projections from the bottom so as to make poor contact with the capillary sheet, then it is desirable to provide a wick which contacts the capillary sheet and extends upwardly through an opening in the bottom of the container into soil within the container. On the other hand, if the bottom of the plant container is flat so as to make good contact throughout with the capillary sheet, then the employment of a wick is unnecessary.

FIG. 3 illustrates that embodiment of this invention which comprises a duplex supporting tray. The use of such a supporting tray is particularly advantageous when this invention is employed on a small scale for growing potted plants in residences and conservatories by those who grow plants in laboratory research and as a hobby. The trays may be of any desired dimension but ordinarily do not exceed dimensions which would make handling of the trays inconvenient. In the embodiment shown there is an upper tray 25 which may be made of a suitable substantially rigid material such as plastic having a smooth upper surface that is wetable. The upper surface of the tray 25 is directly covered by the capillary sheet 26 which ordinarily has the same lateral dimensions as the bottom of the tray 25. As shown the under wetable surface of the capillary sheet is in face-to-face unbonded contact with the upper smooth wetable surface of the slab that forms the bottom of the tray 25. A small reservoir 27 is provided which contains water 28 which preferably is fed into the interface between the capillary sheet and the surface of the tray through one or more leader tubes 29 which preferably are of such small internal diameter as to feed the water in a gradual manner into the interface for lateral capillary distribution throughout. Alternatively the water from reservoir 28 may be gradually fed onto the upper surface of the capillary sheet so as to be discharged underneath the container 27 or other object resting on top of the capillary sheet for capillary travel down into the interface where it becomes laterally distributed.

The upper tray 25 is supported by the lower tray 30 so that the bottom of the upper tray is in adjacent spaced relation to the upper surface of the lower tray 30 by the legs 31 protruding from the bottom of the upper tray 25. There is a drain opening 32 in the bottom of the upper tray through which any excess aqueous liquid may drain so as to accumulate and thereby provide a reservoir of liquid 33 which is stored in the bottom of the lower tray. In order that the liquid that is drained into the lower tray may be utilized by plants being grown while supported by the upper tray, a wick extends from adjacent the upper surface of the lower tray through the drain opening 32 and into the interface between the capillary sheet and the upper surface of the bottom of the upper tray. In the embodiment shown this wicking action is provided by a tube 34 of the silica sand catalyst sheet which per se is shown in FIG. 8. While the wicking action of the silica sand catalyst sheet is preferred for the reasons hereinabove mentioned, other wick materials may be used for the purpose described. When the duplex support tray is provided in the manner described, water will be directed from the reservoir 27 into the interface between the upper surface of the bottom of the upper tray and the lower surface of the capillary sheet and after the water in the reservoir 27 has been exhausted the moisture in the region of the interface will continue to be supplied by capillary action from the liquid 33 that has drained into the lower tray until this liquid likewise has been exhausted.

The types of plant containers hereinabove referred to are shown in FIG. 3. The container 35 is illustrative of a container which is provided with a flat bottom for making contact substantially throughout with the capillary sheet. When the container is made in this way a wick may be dispensed with. Preferably the flat bottom container that is used without any wick is made with openings in the bottom that are somewhat larger than those in the bottom of a conventional plant container. The opening may be provided in various ways. FIG. 6 is illustrative of suitable openings in the bottom of a plant container. Preferably the total area that is open is at least about 30% and preferably 40% of the total area of the bottom of the container. While it is preferable that the openings be somewhat larger than conventional, plant containers having bottom openings of conventional size also may be employed with excellent results provided the container bottom is flat so as to make contact substantially throughout with the upper surface of the capillary sheet. When a flat bottom container is used without any wick it normally is desirable to initially jar the soil in the container down slightly so as to assure close proximity to the upper surface of the capillary sheet.

The container 36 in FIG. 3 is of the type which has protuberances 37 from the bottom and when this type of plant container is used the wicking action into the soil in the plant container can be provided by a wick 41 (see also FIG. 7) which makes contact with the capillary sheet and extends upwardly from an opening in the bottom of the container into soil within the container. Preferably the wicking action is provided by a strip of the silica sand catalyst sheet which has ears 42 positioned so that the silica sand coating is in contact with the upper surface of the capillary sheet.

When a duplex tray is employed, as illustrated in FIG. 1, it is convenient that a portion of the lower tray extend slightly beyond one margin of the upper tray as indicated at 38 so that one may readily observe whether or not any aqueous liquid is present in the lower tray.

FIG. 4 is illustrative of an additional embodiment of the duplex tray shown in FIG. 3 wherein the different portions are indicated by like reference characters. In this modification a sheet of essentially continuous wetable plastic 39 is initially spread over the bottom bed of the upper tray and the water is fed into the interface between the upper surface of the continuous plastic sheet and the lower surface of the overlying capillary sheet. This embodiment of the invention is merely shown for the purpose of indicating that the duplex tray embodiment of the invention does not necessarily require that the capillary sheet rest on the upper surface of the rigid bottom bed of the upper tray. When the upper surface of the rigid bottom bed is smooth and wetable, then the plastic sheet 39 preferably is omitted. However, there may be circumstances such that the presence of the plastic sheet 39 may be desirable. In this connection it may be added that if in a larger installation appropriate for use in the greenhouse the upper surface of the rigid support bed is sufficiently regular and is sufficiently wetable, the plastic sheet 12 shown in FIGS. 1 and 2 may be omitted and water may be fed into the interface that is formed between the upper surface of the underlying bed and the overlying capillary sheet. However, in most greenhouse installations the supporting bed, is made of material such as plywood that is excessively absorptive and therefore interferes with the lateral travel of the water underneath the capillary sheet. The surface that directly underlies the capillary sheet should, in the practice of this invention, be substantially impervious and this also applies to the capillary sheet itself except for the capillary openings therein. In the embodiment shown in FIG. 4, water from the reservoir 33 may be drawn up into the region of the interface between the upper surface of the continuous plastic sheet 39 and the undersurface of the capillary sheet 26 by a suitable wick which preferably is afforded by a tube of the silica sand catalyst sheet that is similar to that shown in FIG. 8 with the ears 43 in the region of the interface occurring so as to directly underlie the capillary sheet.

While it is not normal practice, one may gain the advantage of the duplex tray feature of this invention by substituting for the plastic sheet 39 a silica sand catalyst sheet as hereinabove described which has the surface presenting the silica sand layer in face-to-face contacting relation with the underside of the overlying capillary sheet as also is described in my U.S. Pat. No. 4,001,968. This embodiment of this invention is mentioned for the purpose of illustrating the fact that the invention of my prior patent can lend itself to use with a duplex tray for the purposes herein described. However, when the duplex tray is employed, it is preferable in the interest of economy and convenience to employ the embodiment of this invention shown in FIG. 3 wherein the underside of the capillary sheet directly overlies the upper surface of the substantially rigid wetable slab which forms the bottom of the upper tray. The container 44 of FIG. 4 is similar to the container 36 of FIG. 3.

The duplex tray combination shown in FIG. 5 is similar to that of FIG. 3 and like parts are indicated by like reference characters. The embodiment of FIG. 5 is illustrative of the preferred practice of this invention wherein a plurality of layers of the capillary sheet is used. In FIG. 5 the additional capillary sheet 45 underlies the uppermost capillary sheet 26 and overlies in directly contacting relation to the upper surface of the bottom of the tray. One also may employ more than two layers of the capillary sheet. The use of a plurality of layers of the capillary sheet is especially desirable in the case of plants that are left in the same position resting on the upper surface of the uppermost capillary sheet for a substantial period of time such as in the growing of tomato plants or bringing young flowering plants to maturity. Accordingly, it is to be understood that the term "capillary sheet" as used herein and in the claims has application not only to a single capillary sheet but also to a capillary sheet in the form of a plurality of unbonded contacting layers of single or individual plastic sheets having capillary openings therein as hereinabove described. In FIG. 5 the container 47 is a flat bottom container similar to container 35 shown in FIG. 3. The pattern and dimensions in the openings in the bottom of the flat container 47 are shown in FIG. 6. Particularly when a container having a flat bottom is used some roots of the plant growing in the container is seeking water extend into and spread out laterally in the interface underlying the capillary sheet. This is beneficial in facilitating what is regarded as a plant respitory action wherein water containing nutrients is taken up by the plant roots while a certain amount of water from which nutrients have been removed which contain plant excrement is carried away. Different plant varieties have different patterns as regards root depth and by employing a plurality of capillary sheets conditions are made more favorable with a greater range for growing plants to select preferred root depth. It would not be inconsistent with the practice of this invention when using an embodiment of this invention comprising a plurality of overlying capillary sheets to replace one of the capillary sheets other than the topmost sheet with a sheet of felt or other wetable water absorptive material, e.g. the sheet 45 of FIG. 5. The embodiment of FIG. 5 may be provided with a drain having a silica sand wicking tube 34 therein (not shown) in correspondence with the drain 32 and silica sand wicking tube shown in FIG. 3.

A further duplex tray embodiment of this invention is shown in FIG. 9. The upper tray 48 and the lower tray 49 are identical. Each has an upstanding border rim 50 and a downwardly extending continuous or discontinuous strip 51 positioned and dimensioned so that the upper tray may be stacked above the lower tray with the bottom strip 51 of the upper tray contacting the upper surface of the lower tray and with the undersurface of the upper tray spaced substantially from the upper surface of the lower tray. Adjacent each end of the upper tray there is a drain opening 52. The upper surface of the upper tray is wetable and is covered over by two of the wetable capillary sheets 53 and 54, respectively. Water from the reservoir 55 is fed gradually by the feeder tube 56 which discharges underneath the bottom of the reservoir 55 and the upper surface of the capillary sheet 53 upon which the reservoir 55 rests whereby water is carried into the interface between the capillary sheet and the interface between the undersurface of the capillary sheet 54 and the upper wetable surface of the upper tray 48 for spreading by capillary action to the area of the upper capillary sheet 53 upon which the plant container 57 rests. FIG. 9 illustrates the optional employment of a preformed wetable water absorptive sheet material 61 such as felt between the bottom of the plant container 57 and the upper surface of the capillary sheet 53 thereby facilitating capillary travel of water into the soil in the container 57 from the upper surface of the capillary sheet 53. While the use of such a sheet of water absorptive material is within the practice of this invention, excellent results are obtained without it and usually it is not used.

Any excess of water from the reservoir 55 will drain through one or both of the drain openings 52 and accumulates in the lower tray. In FIG. 9 an alternative expedient is shown for accomplishing return flow by capillary action from water in the lower tray to the capillary interface provided by the capillary sheets 53 and 54 on the upper tray after flow from the reservoir 55 has ceased. According to this embodiment a portion of the drain opening 52 and of the surface of strip 51 that is continuous therewith is provided with a capillary silica sand layer 58 by applying a conventional adhesive that is sticky before drying is complete and applying to it while sticky a dusting of silica sand so as to adhere and provide a capillary surface essentially corresponding with that of the silica sand catalyst sheet hereinabove mentioned. The capillary sand layer also is extended at 59 so as to underlie the capillary sheet on the upper tray. While the capillary action of the adherent silica sand coating is utilized in one form of wicking material by which return flow of water is accomplished from the lower tray to the interface between the capillary sheets used to the interface between the lower capillary sheet and the surface of the upper tray, said interfaces are effective in obtaining continued travel by capillary action to any area of the uppermost capillary sheet that is under a plant container even through the wetable surfaces presented at said interfaces are substantially smooth as contrasted with a surface such as silica sand that in and of itself is effective to induce capillary travel. The number of plant containers that may be supported by a given duplex tray is limited only by the relative dimensions of the tray and of the container.

The water that is fed in for subirrigation may, if desired, have a small amount of a plant nutrient therein. Alternatively, as illustrated in FIG. 9, particles 60 of slow release fertilizer may be distributed in appropriate amount in the capillary interface or interfaces provided by the capillary sheet. They also may be employed in a similar manner in connection with the other embodiments of this invention described herein.

Figure 10:
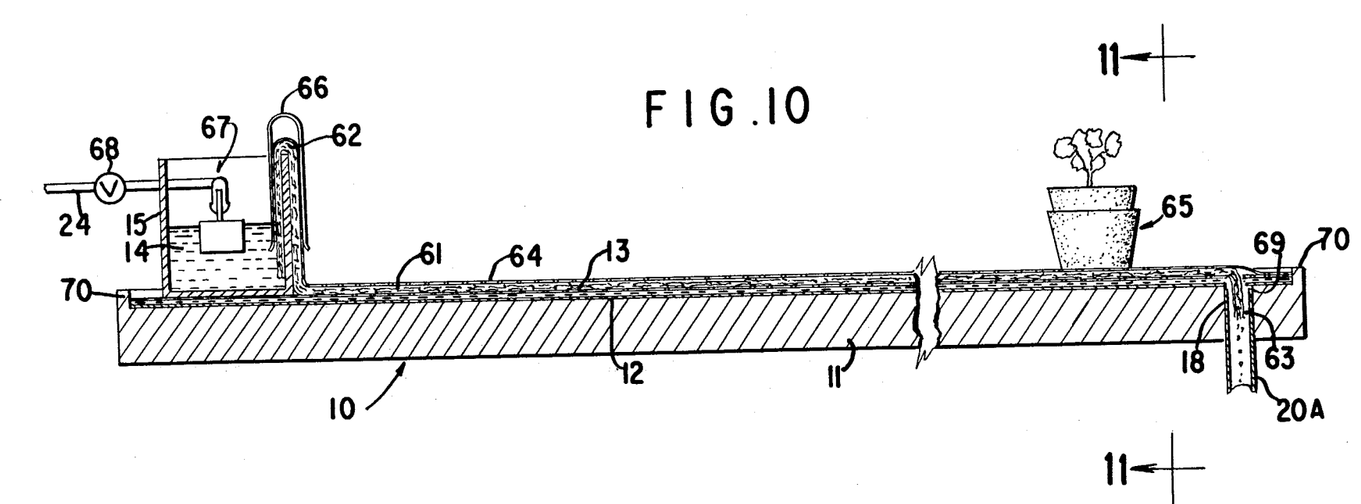

FIG. 10 is similar to FIG. 2 except that an alternative means is shown for feeding water 14 from the reservoir 15 so as to become distributed to and about the interface underlying the capillary sheet 13, namely, between the lower surface of the capillary sheet and an underlying substantially flat surface presented by the support bed. The pallet 10 comprised in support bed, the plastic sheet 12 spread thereover and the underlying capillary sheet correspond respectively with the corresponding parts shown in FIGS. 1 and 2. In the embodiment shown in FIG. 10, water 14 is removed from reservoir 15 by means of a wick 61 which has a reverse bend 62 therein that passes over the rim of the reservoir 15 and which thereafter extends longitudinally along the surface of the capillary sheet. Preferably the wick 61 extends to the drain 18 near the opposite end of the pallet and has an end portion 63 extending into the upper portion of the drain 18. A strip of plastic overlies the wick 61 to minimize evaporation. The wick 61 and the strip 64 of plastic where they pass over the rim of the reservoir are held in place by a resilient clip 66.

When in use water from the reservoir 15 travels by capillary action along the wick 61. As it does so, it is disseminated laterally between the capillary sheet 13 and the strip 64 of plastic and thence through the capillary sheet into the interface between the capillary sheet 13 and the plastic sheet 12 that is supported by the pallet 10 with ultimate migration into the soil in the planter 65 resting on the capillary sheet. Preferably the strip of plastic has capillary openings therein corresponding to those in the capillary sheet 13 so that in the event a planter may rest in whole or in part on the strip 64, the capillary travel into soil in the planter will not be impaired. It also is preferable that the strip 64 be opaque. If desired the wick 61 may be sandwiched between the strip 64 and a strip of the capillary sheet material that is interposed between the wick 64 and the capillary sheet 13.

Figure 11:
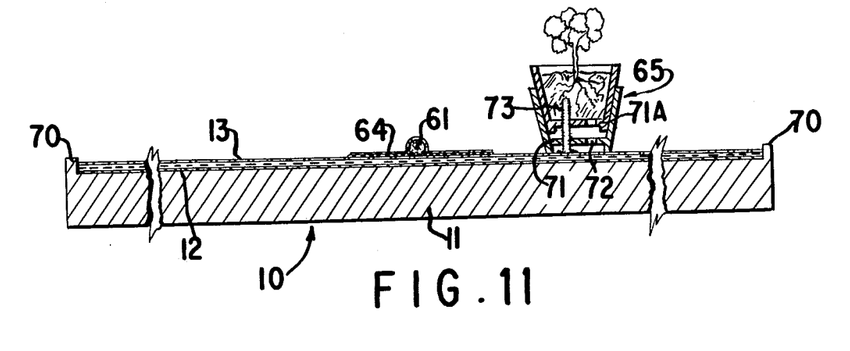
FIG. 11 is a sectional elevation on the line 11—11 of FIG. 10.

The employment of wick means as illustrated in FIGS. 10 and 11 lends itself to control of water flow by varying the number and/or dimensions of the wicks. By empolyment of a plurality of wicks the water can be distributed uniformly and rapidly regardless of the size of the pallet. By employing the means 67 for raising and lowering the level of the float valve, the level of the water in the reservoir may be controlled and the rate of flow of water feed along the wicks can correspondingly be controlled; increase in wicking action being responsive to an increase in the water level and vice versa. A preferred means for raising and lowering the level of the float valve is disclosed in my U.S. Pat. No. 3,778,928. When it may be desirable to discontinue the wicking action, the water entering into the reservoir 15 may be shut off by the shut-off valve 68 in the waer inlet line 24. In such case the wick will serve to absorb and drain off any excess water. Any water which reaches the drain 18 may fall into a catch basis or may be recycled to the reservoir 15 as shown in FIG. 2 and described hereinabove.

Sometimes it is desirable to accomplish rapid moistening of soil in containers resting in the capillary sheet 13. In such case the drain line 20A in the drain 18 may be constructed so as to be in slidable frictional contact with the pallet 10. By elevating the level of the upper end 69 of the line 20A so as to be slightly above the level of the upper surface of the pallet 10, an accumulation of water at the interface between the under surface of the capillary sheet 13 and the upper surface of the plastic sheet 12 may take place until rapid wetting has been accomplished whereupon the upper end 69 of the drain line 20A may be returned to position substantially flush with the upper surface of the pallet 10. The accumulation of water as described is facilitated by the marginal strip 70 that extends alon the margins of the pallet 10.

The means for accomplishing feed of water that is illustrated in FIGS. 10 and 11 also has application in connection with the embodiment that is shown in FIGS. 1 and 2. It likewise can be employed in connection with the embodiments shown in FIGS. 3–9. Moreover, if in any of the embodiments the surface presented by the support bed is essentially smooth and is wetable in the absence of plastic sheet 12, the plastic sheet 12 may be omitted.

Any of the plant containers shown and described in connection with FIGS. 1–9 may be employed when employing the embodiement shown in FIGS. 10 and 11. In FIGS. 10 and 11, an additional type of planter is shown which is especially desirable in providing soil moisture control favorable to certain plants. As shown, the container 65 has a double bottom. This can be easily achieved by using conventional containers having a slight taper that permits one to be telescopically slid into the other. The result in that the bottoms 71 and 71A having conventional openings 72 therein are spaced from each other. A wick 73 passes successively through an opening in bottom 71A and another opening, preferably in alignment, in the bottom 71 so as to come into contact adjacent its lower end with the capillary sheet 13 and to extend at its upper end into soil in the planter. The planter embodiment shown in FIG. 10 and 11 may also be used in connection with any of the other embodiments shown in FIGS. 1–9. Moreover, this type of planter has utility when used per se whenever the lower end of the wick is in contact with water or with a wet material including, or other than, the capillary sheet. The wick that is employed in such a double bottom planter preferably is of the silica sand catalyst sheet type that has been described hereinabove. Instead of providing a planter having a double bottom by telescopically fitting two conventional planters one within the other, a planter having a double bottom as and for the purposes above described may be provided in other ways as by providing a second bottom that is either permanently or detachably secured to the plant container so as to be in spaced relation below and with respect to the bottom of said plant container.

What is claimed is:

1. A soil irrigation system for supplying water to soil in a plant container by capillary travel upwardly into said soil through an opening in the bottom of said container which system comprises a support bed for supporting one or more of said containers that presents a substantially level water impervious wetable surface, a capillary sheet disposed in overlying relation with respect to said surface the under surface of which is wetable and is in face-to-face unbonded relation with respect to the upper surface presented by said support bed and the upper surface of which is disposed for making contact with a plant container placed thereon, and water-feeding means for feeding water into the interface between said surface and said capillary sheet, said water feeding means comprising a reservoir, a wick extending from the interior of said reservoir over the rim of said reservoir and thence along the upper surface of said capillary sheet, strip of plastic overlying and protecting said wick having substantially greater lateral dimensions than said wick and having a wetable under surface in direct contact with said wick and overlying said capillary sheet on opposite sides of said wick, said capillary sheet having a multiplicity of substantially evenly space capillary openings therein that are essentially from about 0.05 to about 0.145 inch in diameter.

2. A soil irrigation system according to claim 1 wherein said support bed has a drain opening therein that is remote from said reservoir.

3. A soil irrigation system according to claim 2 which includes means for adjusting the level of the upper end of said drain opening between position flush with the upper surface of the support and position above said surface.

4. A soil irrigation system according to claim 2 wherein the end of said wick remote from said drain opening extends into said drain opening.

5. A soil irrigation system according to claim 1 wherein the surface presented by said support bed is substantially smooth.

6. A soil irrigating system according to claim 1 wherein said reservoir is situated above the level of the surface of said support bed and which comprises means for holding said wick and said strip in place in the region where they pass over the rim.

7. A soil irrigation system for supplying water to soil in a container for growing a plant by capillary travel upwardly into said soil through an opening in the bottom of the container that presents a substantially smooth and level water impervious wettable upper surface, a capillary sheet which is dispersed in overlying relation with respect to said surface and the upper surface of which is disposed for making contact with a container placed thereon, a sheet of wettable water absorptive felt material interposed between and in contrast with said surface of said support bed and the under surface of said capillary sheet and means for feeding water between said surface of said support and the under surface of said capillary sheet to moisten said sheet of wettable material.

* * * * *